United States Patent
Breus et al.

(10) Patent No.: US 8,591,169 B2
(45) Date of Patent: Nov. 26, 2013

(54) ROTOR FOR GENERATING ELECTRICAL POWER FROM A FLOW MEDIUM

(76) Inventors: Sergei Breus, East Blue Hill, ME (US); Valentin Breus, Saint Petersburg (RU)

(*) Notice: Subject to any disclaimer, the term of this patent is extended or adjusted under 35 U.S.C. 154(b) by 921 days.

(21) Appl. No.: 12/714,580

(22) Filed: Mar. 1, 2010

(65) Prior Publication Data
US 2010/0221116 A1 Sep. 2, 2010

Related U.S. Application Data

(60) Provisional application No. 61/286,045, filed on Dec. 14, 2009, provisional application No. 61/209,105, filed on Mar. 2, 2009.

(51) Int. Cl.
*F03D 7/06* (2006.01)
(52) U.S. Cl.
USPC .............. 415/4.2; 415/4.4; 415/907; 416/142
(58) Field of Classification Search
USPC .......... 416/131, 132 B, 132 R, 124, 142, 110, 416/111, 160, 170 R; 415/4.2, 4.4, 907
See application file for complete search history.

(56) References Cited

U.S. PATENT DOCUMENTS

2002/0187038 A1* 12/2002 Streetman ...................... 415/3.1
2008/0181777 A1* 7/2008 Bailey ........................... 416/117

FOREIGN PATENT DOCUMENTS

GB 2119025 A * 11/1983 ................ F03D 3/00

* cited by examiner

*Primary Examiner* — Edward Look
*Assistant Examiner* — Juan G Flores
(74) *Attorney, Agent, or Firm* — Patricia M. Mathers

(57) ABSTRACT

A power generation system that generates power in low flow situations is disclosed. The system includes a set of vanes, wherein each vane is mounted on a corresponding mast, so as to selectively transmit energy from the flow medium to a rotor shaft or to freely deflect in the direction of flow, depending on whether the flow impinges on the vanes in an energy-producing or a non-energy-producing direction. This is achieved by mounting each vane on its mast, so that it deflects in the flow direction when the vane is subjected to non-energy-producing flow energy, and also coupling each vane to the mast of an adjacent vane, so that the vane exerts a pull force on the mast of the adjacent vane, when the vane is capturing energy-producing flow energy.

7 Claims, 3 Drawing Sheets

ROTOR FOR GENERATING ELECTRICAL POWER FROM A FLOW MEDIUM

This application claims priority from U.S. Provisional Applications 61/209,105, filed on Mar. 2, 2009, and 61/286,045, filed on Dec. 14, 2009.

BACKGROUND INFORMATION

1. Field of the Invention

The present invention relates to the field of power generation from a renewable power source. More particularly, the invention relates to the use of a rotor and vanes in a flowpath of a flow medium, for generating electrical power.

2. Description of the Prior Art

Humans have extracted power from the energy of flowing streams for centuries. Typically, this is done by forcing the water over a dam and using the head pressure from the drop to turn a turbine. Building a dam is a very costly effort and the barrier to flow caused by the dam typically has serious negative consequences for wildlife and, particularly, for migrating species of fish. As a result, people have tried many different ways of extracting energy from flowing water simply by relying on the kinetic energy of a flowing stream. Wind turbines rely on the flow of air and are becoming ever more popular as a source of clean energy. One type of wind turbine is the Savonius wind turbine, which is a drag-type vertical axis wind turbine generator that typically has a very low efficiency, around 15%. As a result, the Savonius wind turbine is generally not deemed suitable for electricity generation, except for small-scale production. This type of turbine is also used in installations that require slow rotation and high torque, such as in pumping water or grinding grain.

What is needed therefore is apparatus for and a method of extracting energy from a flow medium. What is further needed is such apparatus and method that is mechanically uncomplicated, yet efficient. What is yet further needed is such apparatus and method that is suitable for extracting energy from very low flow currents, with high efficiency and low impact on the natural environment and wildlife.

BRIEF SUMMARY OF THE INVENTION

The invention is a power generating system comprising a rotor and a system of vanes that are placed in the flowpath of a fluid. The vanes may also be referred to as paddles or blades. The power generation system according to the invention is most typically placed in the flowpath of water, such as in a stream or river, or in a tidal zone, in which case the system is referred to as a tidal in-stream energy conversion device (TISEC), but generally, the power generation system may be operated successfully and effectively in the path of just about any type of flow medium, be it liquid or gaseous. For purposes of simplicity and illustration only, reference may be made hereinafter to a flowing stream and also to water as the flow medium. This is not intended to be limiting and it is understood that the power generation system according to the invention may be placed in the flowpath of a fluid other than water, such as air, oil, photons, planetary atmosphere, etc.

The vanes are mounted on masts and the masts are rigidly attached to the shaft of a rotor. The flowpath of the flow medium urges the vanes to move in the flow direction, i.e., in the downstream direction. The rotor includes a rotor shaft that rotates in one direction only and which transmits the rotation to the rotor, which, in turn, is connected to an electric generator that generates electricity as the rotor rotates. The movement of the vanes is selectively constrained, so that some of the vanes are allowed to deflect freely in the direction of flow, while the rest of the vanes are constrained to receive the force of the flow, which is then transmitted to the rotor, causing it to rotate. Thus, the flow impinging on the vanes, although flowing in the downstream direction, includes a flow component that is a forward or power-generating flow and a flow component that is a reverse or non-power-generating flow. In the course of rotation of the rotor shaft, each of the vanes is at some point subjected to a greater return flow force than a power-generating flow force. Those vanes receiving a greater power-generating flow than a non-power-generating flow transmit force to the rotor shaft; those vanes receiving a greater reverse flow than the power-generating flow deflect more or less in the downstream direction. As a result, those vanes that are deflecting in the downstream direction allow flow through the power generation system, and therefore allow marine life to pass through the system unharmed. This aspect also reduces significantly the drag on the system, because the deflecting vanes present a minimal strike zone or area.

As with conventional Savonius type rotors, the rotor of the power generation system according to the invention cannot rotate at a velocity that exceeds the velocity of the current. This limitation is offset, with regard to efficiency, by the fact that the rotor requires very low flow to rotate. Preliminary tests have shown that the power generation system according to the invention begins capturing energy and generating power at flows as low as 0.3 m/s and has an optimal Tip-Speed-Ratio (TSR) in the range of 0.3 to 0.5. This is in contrast to typical TSR values in the range of about 1.0 to 5.0 for conventional turbines. The low flow rate and low TSR indicate that the system does not suffer from the disadvantages mentioned above with regard to conventional turbines, including Savonius and other types. In other words, the power generation system according to the invention does not lie fallow in low-flow periods. The power generation system will operate at very low tidal flows, rather than just at peak flow. The low operating speed may also have a positive effect on fish mortality rates, reducing the mortality significantly over the mortality rates associated with conventional TISEC systems.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
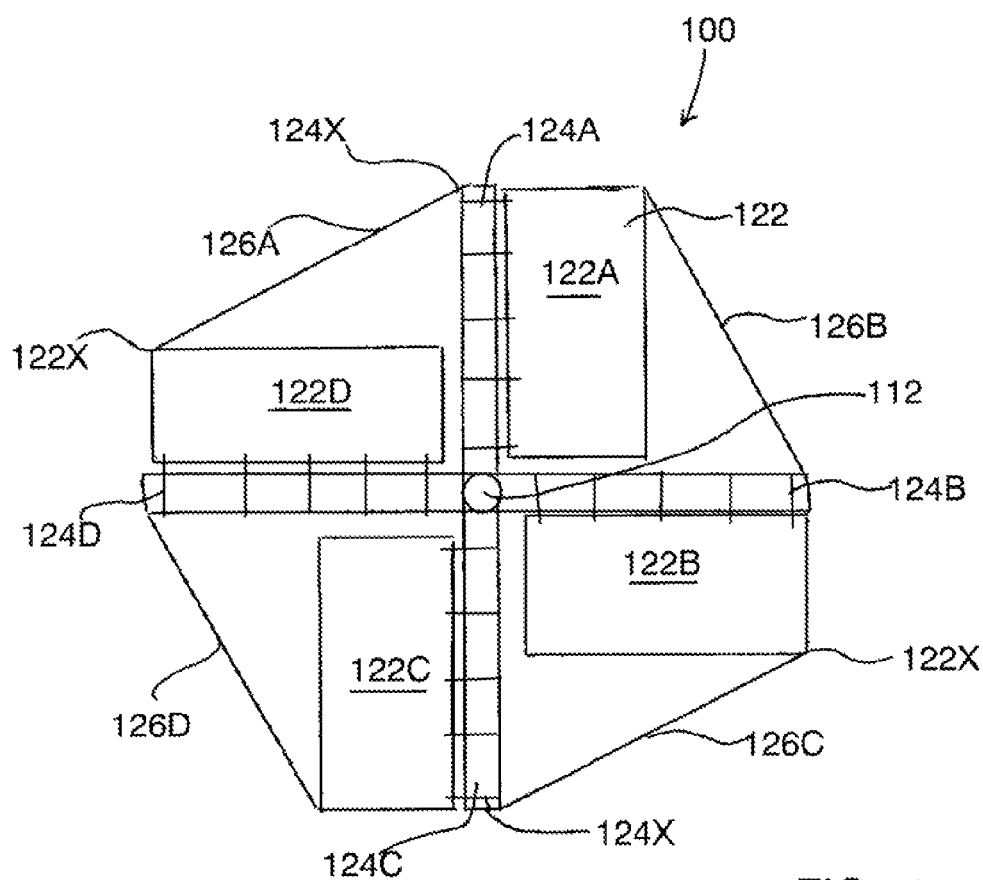
FIG. 1 is a plane view of the power generation system according to the invention, illustrating how the vanes are coupled to the masts.
Figure 2:
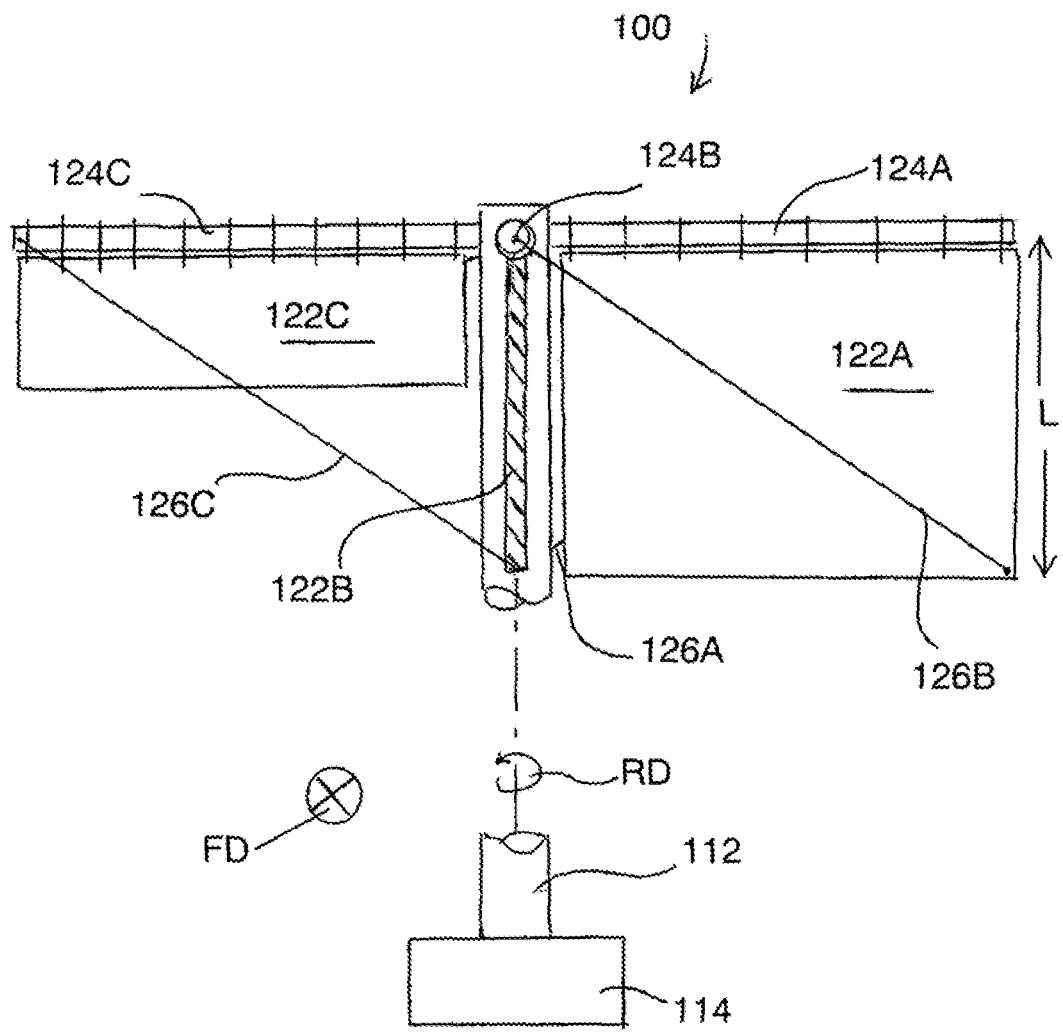
FIG. 2 is a side elevational view of the power generation system of FIG. 1.

FIGS. 1 and 2 are schematic illustrations of a power generation system 100 according to the invention. The power generation system 100 comprises power generation means for transmitting rotational motion to an electrical generator and energy-capture means for capturing kinetic energy from a flow medium, such as a liquid or a gas. The power generation means 110 includes a rotor shaft 112 that is attached at one end to a generator 114. The generator 114 is a conventional piece of equipment and is not described in any detail herein. Also, the generator 114 is shown mounted at the bottom of the power generation system, but it can just as well be mounted at the top. The energy-capture means 120 comprises a set of foils or vanes 122 and masts 124, each vane 122 being fastened to a corresponding mast 124. A set of four vanes 122 is shown in the figures, but this is for illustration purposes only. It is understood, that the power generation system 100 may be constructed with any suitable odd or even number of vanes. The vanes 122 may be paddle-like, as shown in FIGS. 1-3, or may be curved as is known to do with conventional Savonius-type wind turbines, so as to reduce drag, etc.

The power generation system 100 may be installed in the flowpath of a flow medium, such that the rotor shaft 112 is oriented orthogonal or parallel to the direction of flow. In a first installation, the power generation system 100 is installed in a riverbed, for example, with the rotor shaft 112 oriented orthogonal to the direction of flow of the water, i.e., set vertical with reference to the ground. This set-up is deemed the optimal one in situations in which the rate of flow is relatively slow, such as in bodies of water with slow moving currents or ocean tides, or in the presence of low wind velocities. In this orientation, FIG. 1 is a top plane view of the power generation system 100. For purposes of illustration only, all four vanes 122 are shown fully extended, so as to illustrate how the vanes 122 are coupled to the masts 124. Each vane 122 is pivotably coupled along one edge of the vane to the corresponding mast 124 with an attachment means 128 such that the vane 122 may swing about the mast 124 when a flow pressure from the flow medium is exerted against the vane. Various suitable means of attachment are conceivable. In the embodiment shown, the attachment means 128 comprises a plurality of rings that are attached to the upper edge of the body of the vane 122 and that allow the vane to swing freely about the mast 124. The energy-capture means 120 further comprises motion restraint means 126 which serves to convert the motion of a vane under forward flow conditions to rotational motion on the rotor shaft 112. There are many ways in which this can be accomplished. FIGS. 1-3 illustrate a first embodiment of the motion-restraint means 126, which is a system of flexible connectors that connects each vane 122 to an adjacent mast 124. By "flexible connector" is meant a coupling means that is capable of exerting a pull force, but incapable of exerting a push force. Thus, for example, FIG. 1 shows four vanes 122, designated individually 122A, 122B, 122C, and 122D, and four corresponding masts, designated individually 124A, 124B, 124C, and 124D. The plurality of flexible connectors 126 are similarly designated 126A, 126B, 126C, and 126D. Each flexible connector 124 couples a lower edge 122X of one vane with the outer end 124X of the mast 124 of an adjacent vane 122. Thus, for example, a first flexible connector 126A flexibly couples the lower end 122X of the vane 122D with the outer end 124X of the mast 124A. Additional embodiments of the motion-restraint means 126 are discussed below in conjunction with FIGS. 4 and 5.

Referring to the description above, with the rotor shaft installed vertical to the ground, FIG. 2 is an elevational view of the power generation system 100 according to the invention. The power generation system 100 is installed in the flowpath of a body of water that has a rather strong current, such as a stream or river. The flow direction FD is into the plane of the drawing sheet, as indicated by the tail of an arrow FD. The vanes 124A and 124C are aligned perpendicular and the vanes 124B and 124D aligned parallel to the flow direction FD. Flow pressure against the vanes 122A and 122C exerts a force on the body of the vanes in the flow direction FD. Vane 122C appears foreshortened, because the flow is forcing it to swing about the mast and extend downstream in the flow direction at some angle from the vertical. The flexible connector 126D, which couples the lower edge of vane 122C with the outer end of the mast 124D, obscured from view by the rotor shaft 112, is incapable of exerting a push on the mast 124D and, thus, the pressure exerted on vane 122C is not transmitted as a force to the mast 124D. The body of the vane 122A is constrained by the flexible connector 126B from moving in the downstream direction. This places the flexible connector 126B in tension, which exerts a pull to the right on the mast 124B, which in turn transmits a rotational force to the rotor shaft 112 in the direction indicated by arrow RD. The vanes 122B and 122D, being oriented essentially parallel to the direction of flow in this view, do not exert any pull forces on the adjacent masts 124C and 124A. If the direction of flow were reversed, the flow force would push against the rear side of vane 122C, which would be constrained from swinging about its mast 124C by the motion-restraint means 126D. This would effectively pull the mast 124D (obscured from view) toward the left, again transmitting a rotational force to the rotor shaft 112 in the same direction indicated by arrow RD. In this manner, pressure from the flow medium past the vanes 122, regardless of direction of flow, causes the rotor shaft 112 to rotate in a single direction.

Figure 3:
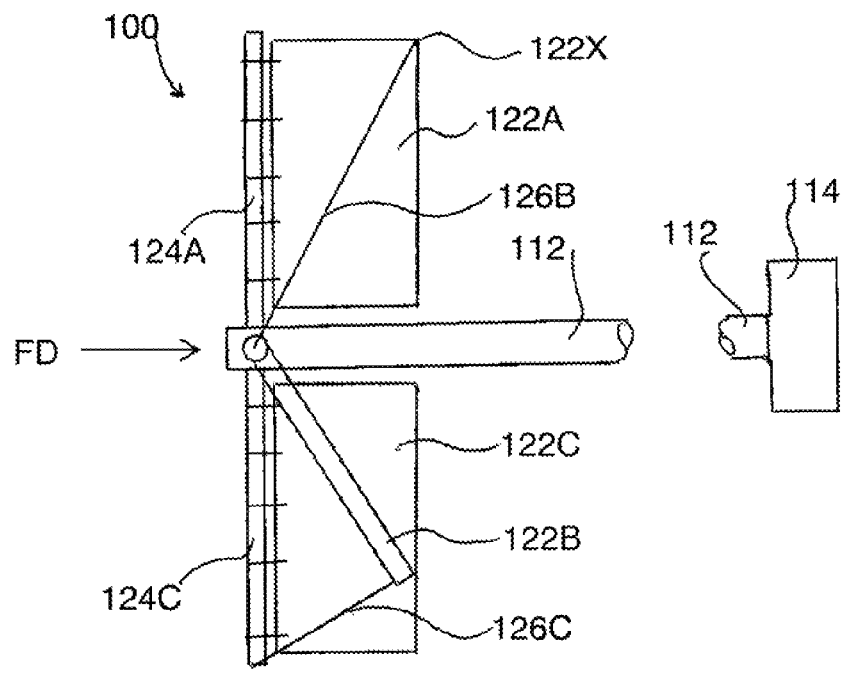
FIG. 3 is a top plane view of the power generation system according to the invention, with the rotor shaft oriented parallel to the flowpath of the flow medium.

Now referring to FIG. 3, the power generation system 100 is installed with the rotor shaft oriented parallel to the flowpath of the flow medium. This parallel set-up is particularly suitable for installations in which the rate of flow is relatively fast, such as in the presence of high wind velocities, high pressure resulting from a waterfall, etc., because the rotor shaft 112 does not have to withstand the high wind velocities. FIG. 3 is a top plane view of the power generation system 100 in this parallel set-up, under conditions of high flow, with the vanes 122 extending in the downstream flow direction. Each vane deflects in the downstream direction, which places each some tension force on each of the flexible connectors 126A-126D, which in turn exerts a rotational force on each of the masts 124A-124D. Assuming the flow medium flows with even strength over the power generation system 100, each vane 122 deflects approximately to the same degree, thereby exerting approximately the same amount of force on each mast 124, which in turn forces a rotation of the rotor shaft 112. The power generation system 100 in this parallel orientation may also be used as a brake for water- and aircraft.

Figure 4:
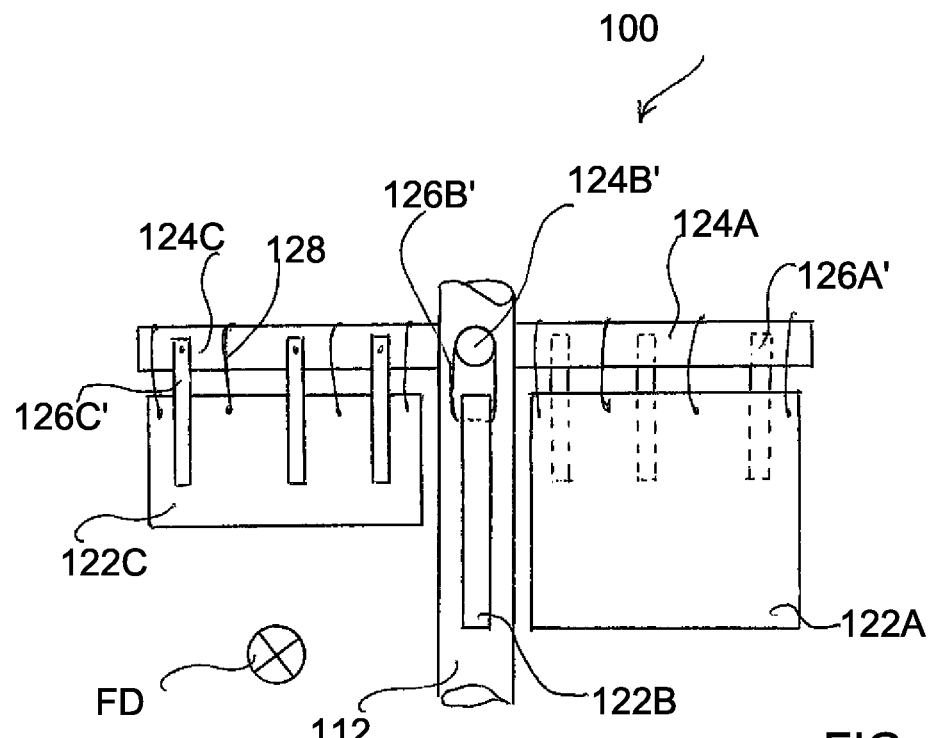
FIG. 4 illustrates a first alternative motion-restraint means.
Figure 5:
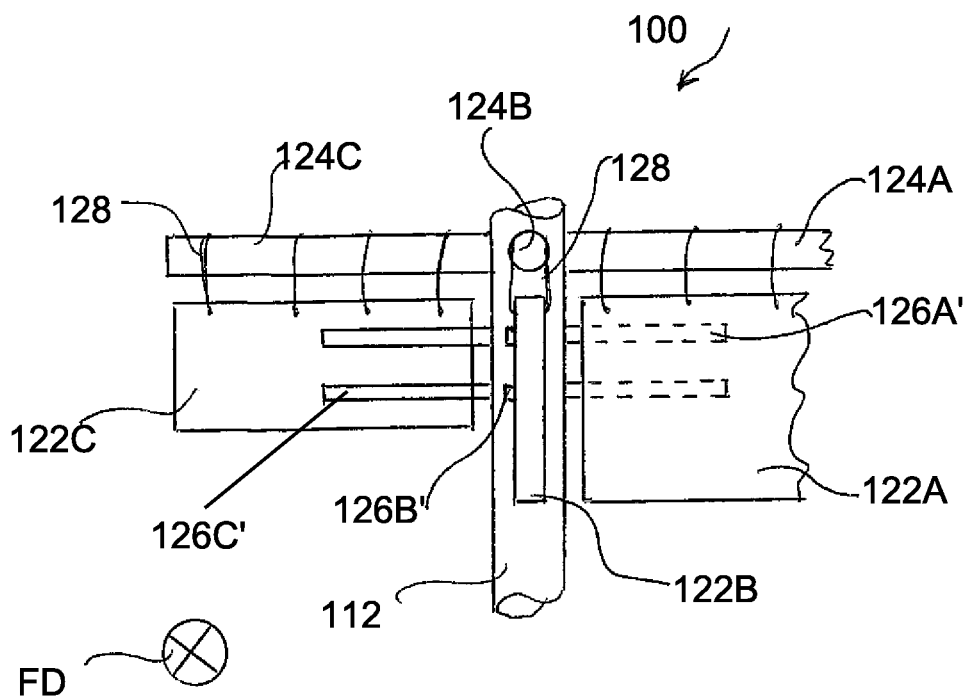
FIG. 5 illustrates a second alternative motion-restraint means.

FIGS. 4 and 5 illustrate additional embodiments of the motion-restraint means 126. In the first embodiment discussed above, the motion-restraint means 126' is a flexible connector that links the outer lower corner of one vane with the outer portion of the mast of an adjacent vane. It is also possible to have a motion-restraint means 126 that is mounted either on the respective mast 124 or on the rotor shaft 112 such that the restraint allows the respective vane 122 to swing about the mast 124 in one direction, yet restrains the vane from swinging in the opposite direction. Such motion-restraint means 126 encompass rigid fixtures or frames that are mounted on the masts or on the rotor shaft and may be combined with the attachment means 128, for example, the attachment means may allow rotational motion in one direction only. FIG. 4 illustrates motion-restraint means 126', that include rigid stops or bars that are mounted on the respective masts 124A-124D. The stops or bars are mounted on the mast so that they are behind the vane with respect to the desired direction of rotation. FIG. 4 illustrates an instantaneous view of the power generation system 100, showing a set of bars 126C' mounted on the front side of the vane 122C, a set of bars 126A' mounted on the rear side of the vane 122A, and a set of bars 126B' mounted on the left side of the vane 122B. Vane 122C appears foreshortened, because is extends downstream as indicated by the flow direction arrow FD. FIG. 5 illustrates the motion-restraint means 126 mounted on or incorporated into the construction of the rotor shaft 112, whereby the vanes 122 are in the same position as in FIG. 4. Again, the motion-restraint means 126' are provided behind the particular vane 122 with regard to the desired direction of rotation.

One of the advantages of the power generation system 100 according to the invention is that the direction of flow is not critical to efficient functioning of the system. Should the direction of flow of the flow medium be other than parallel or perpendicular to the presenting surfaces of the vanes, the motion-restraint means 126 that couples the vanes 122 to the masts 124 ensures that the flow pressure exerted on the vanes will be transmitted as a rotational force to the rotor shaft 112. The forward flow and the reverse flow components, whether in parallel and perpendicular orientation to the rotor shaft, will contribute proportionally to the rotational force. This ability makes the power generation system 100 particularly suitable for use in turbulent flowpaths in which flow direction changes rapidly and radically. A further advantage of power generation system 100 according to the invention is that electrical power generating components may be mounted on the system above or below the waterline. In areas that are not view sensitive, for example, it is desirable to mount the rotor, generator, and electrical energy transmission equipment above the water line and/or remote from the energy capture means, for cost reasons. Equipment that is not submerged in water is easier to install and maintain, and, consequently, less costly.

It is understood that the embodiments described herein are merely illustrative of the present invention. Variations in the construction of the power generation system may be contemplated by one skilled in the art without limiting the intended scope of the invention herein disclosed and as defined by the following claims.

What is claimed is:

1. A power generation system for use in a flowpath of a flow medium, the power generation system comprising:
    a power generation means for transmitting rotational motion to an electric generator, the power generation means including a rotor shaft and a rotor that rotate in an energy-generating direction; and
    an energy-capture means that is coupled with the power generation means, the energy-capture means including a plurality of masts that are affixed to the rotor shaft and a corresponding plurality of vanes for capturing flow energy from the flow medium, a vane of the plurality of vanes being pivotably coupled by means of a flexible connector with a respective one mast of the plurality of masts and also coupled with a mast of an adjacent vane, such that the vane selectively swings about the one mast or exerts a pull force on the mast of the adjacent vane, depending on the direction of the flow energy relative to the energy-producing direction of rotation;
    wherein the vane that is currently in an orientation to receive the flow energy in a forward flow direction transmits the flow energy to the mast of the adjacent vane, which in turn exerts a rotational force on the rotor shaft, causing the rotor shaft to rotate in the energy-generating direction; and
    wherein the vane that is currently in an orientation to receive flow energy in a reverse flow direction swings about the mast, thereby imparting very little force on the rotor shaft; and
    wherein the rotor shaft rotates in one direction only, regardless of the direction of flow that impinges on the plurality of vanes.

2. The power generation system of claim 1, wherein the flexible connector is coupled to an outer lower corner of the vane and to an outer edge of a mast of an adjacent each vane.

3. The power generation system of claim 1, wherein the vane is mounted on the corresponding mast, so as to swing about the mast when the flow energy impinges on the vane in a direction that results in a rotational force on the rotor shaft that is opposite the energy-producing direction of rotation, and so as to transmit the flow energy to the mast of the adjacent vane when the flow energy impinges on the vane in a direction that results in a rotational force on the rotor shaft that is in the energy-producing direction.

4. The power generation system of claim 3, wherein one or more rigid straps are mounted on the corresponding mast, so as to prevent rotation of the vane about the corresponding mast in one direction and allow rotation in an opposite direction.

5. The power generation system of claim 3, wherein one or more rigid straps are mounted on the rotor shaft, so as to prevent rotation of the vane about the corresponding mast in one direction and allow rotation in an opposite direction.

6. The power generation system of claim 1, wherein the vane is a rigid paddle.

7. The power generation system of claim 1, wherein the plurality of vanes includes two or more vanes.

* * * * *